United States Patent
Camminadi et al.

(10) Patent No.: US 10,309,516 B2
(45) Date of Patent: Jun. 4, 2019

(54) MEASURING SYSTEM AND MEASURING METHOD FOR DETECTING VARIABLES ON PLANETARY CARRIERS OF A PLANETARY GEAR TRAIN

(71) Applicant: SIEMENS AKTIENGESELLSCHAFT, München (DE)

(72) Inventors: Julia Camminadi, Oberhausen (DE); Matthias Deicke, Uetze-Schwüblingsen (DE); Jörg Hassel, Erlangen (DE); Reinhold Keck, Fürth (DE); Hans-Henning Klos, Weigendorf (DE); Stefan Von Dosky, Karlsruhe (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 15/554,377

(22) PCT Filed: Mar. 1, 2016

(86) PCT No.: PCT/EP2016/054313
§ 371 (c)(1),
(2) Date: Aug. 29, 2017

(87) PCT Pub. No.: WO2016/139199
PCT Pub. Date: Sep. 9, 2016

(65) Prior Publication Data
US 2018/0038471 A1    Feb. 8, 2018

(30) Foreign Application Priority Data
Mar. 3, 2015   (DE) .................. 10 2015 002 619

(51) Int. Cl.
*F16H 57/01*   (2012.01)
*G01M 13/021*  (2019.01)
(Continued)

(52) U.S. Cl.
CPC ............. *F16H 57/01* (2013.01); *F03D 17/00* (2016.05); *G01M 13/021* (2013.01); *H04Q 9/00* (2013.01);
(Continued)

(58) Field of Classification Search
CPC .................... F03D 15/00; F03D 17/00; F05B 2260/40311; F16H 1/46; F16H 2057/012;
(Continued)

(56) References Cited

U.S. PATENT DOCUMENTS 6,898,975 B2 *  5/2005  Blunt ..................... G01H 1/003
                                                          73/593
8,786,450 B2    7/2014  Dietrich et al.
(Continued)

FOREIGN PATENT DOCUMENTS

CN    102472676 A    5/2012
CN    103122834 A    5/2013
(Continued)

Primary Examiner — Francis C Gray
(74) Attorney, Agent, or Firm — Henry M. Feiereisen LLC

(57) ABSTRACT

A measuring system for detecting variables on planet carriers of a planetary gear train having a plurality of planetary gear stages includes a first sensor which is arranged on one of the planet carriers of one of the planetary gear stages for detecting the variables of a planet gear rotationally connected to the at least one of the planet carriers. An electronics configured for arrangement on the planetary gear train is operably connected to the first sensor for supply of the first sensor with electrical energy.

13 Claims, 3 Drawing Sheets

(51) Int. Cl.
  *H04Q 9/00* (2006.01)
  *F03D 17/00* (2016.01)
  *F16H 1/46* (2006.01)
  *F03D 15/00* (2016.01)

(52) U.S. Cl.
  CPC ..... *F03D 15/00* (2016.05); *F05B 2260/40311* (2013.01); *F16H 1/46* (2013.01); *F16H 2057/012* (2013.01); *H04Q 2209/30* (2013.01); *H04Q 2209/40* (2013.01); *H04Q 2209/88* (2013.01); *H04Q 2209/886* (2013.01); *Y02E 10/722* (2013.01)

(58) Field of Classification Search
  CPC .. F16H 57/01; G01M 13/021; H04Q 2209/30; H04Q 2209/40; H04Q 2209/88; H04Q 2209/886; H04Q 9/00
  See application file for complete search history.

(56) References Cited

U.S. PATENT DOCUMENTS

| | | | |
|---|---|---|---|
| 9,074,912 B2 | 7/2015 | Hassel et al. | |
| 9,335,227 B2 | 5/2016 | Hassel et al. | |
| 9,531,240 B2 | 12/2016 | Deicke | |
| 9,605,710 B2 | 3/2017 | Hassel et al. | |
| 9,678,129 B2 | 6/2017 | Hassel et al. | |
| 9,689,775 B2 | 6/2017 | Deicke | |
| 2008/0279686 A1* | 11/2008 | Demtroder | F03D 17/00 416/61 |
| 2012/0156034 A1* | 6/2012 | Sabannavar | G01M 13/028 416/1 |
| 2012/0160037 A1 | 6/2012 | Dinter | |
| 2012/0319723 A1 | 12/2012 | Hassel et al. | |
| 2013/0130858 A1 | 5/2013 | Degeling | |
| 2013/0303322 A1* | 11/2013 | Kennedy | F16H 3/725 475/149 |
| 2013/0305827 A1* | 11/2013 | Kessler | G01H 9/004 73/649 |
| 2015/0059478 A1 | 3/2015 | Klos et al. | |
| 2015/0082887 A1 | 3/2015 | Haschke et al. | |
| 2015/0247529 A1 | 9/2015 | Klos et al. | |
| 2015/0247778 A1 | 9/2015 | Haschke et al. | |
| 2016/0061190 A1 | 3/2016 | Deicke | |
| 2016/0132616 A1 | 5/2016 | Hassel et al. | |
| 2017/0030335 A1* | 2/2017 | Deicke | F03D 15/10 |

FOREIGN PATENT DOCUMENTS

| | | |
|---|---|---|
| CN | 103711875 A | 4/2014 |
| WO | WO 2011/104433 A1 | 9/2011 |

\* cited by examiner

MEASURING SYSTEM AND MEASURING METHOD FOR DETECTING VARIABLES ON PLANETARY CARRIERS OF A PLANETARY GEAR TRAIN

CROSS-REFERENCES TO RELATED APPLICATIONS

This application is the U.S. National Stage of International Application No. PCT/EP2016/054313, filed Mar. 1, 2016, which designated the United States and has been published as International Publication No. WO 2016/139199 A1 and which claims the priority of German Patent Application, Serial No. 10 2015 002 619.4, filed Mar. 3, 2015, pursuant to 35 U.S.C. 119(a)-(d).

BACKGROUND OF THE INVENTION

The invention relates to a measuring system for detecting variables on planet carriers of a planetary gear train comprising at least multiple planetary gear stages, wherein each planetary gear stage comprises at least one respective sun shaft, at least one respective ring gear, and also at least one respective planet gear which is connected to the respective sun shaft and the respective ring gear by a toothed engagement, and a respective planet carrier which is assigned to the at least one planet gear and is rotationally connected to the at least one planet gear.

Planetary gear trains offer clear advantages in terms of power density and specific torque as compared with conventional spur gear and bevel spur gear trains, and comprise a sun shaft, a planet carrier with planet gears, and also an internally toothed ring gear. Due to a basic cylindrical shape of the ring gears, planetary gear trains for industrial applications frequently have a cylindrical construction. Planetary gear trains can be installed as slip-fit gear trains with a torque support, as bolt-on or flange-connected gear trains, or mounted on a base with an additional frame.

In gear trains, in particular wind power gear trains, bearings represent one of the most frequent causes of failure. The most diverse sensors and measuring systems are employed for monitoring and assessing these bearings.

In evaluating the signals recorded by the sensors, the transmission path from the signal source to the sensor is of critical importance.

Among the most diverse gear train types, in particular multistage planetary gear trains, i.e. with more than one planetary gear stage, a large number of the bearings can still only be monitored poorly or with substantial effort according to the state of the art, since these bearings are situated in a coordinate system that is rotating as compared with the environment.

Different states of the art exist for the different sensor types and evaluations. Thus pressure, temperature, and vibration/acceleration measuring sensors are generally mounted in the form of "static" sensors in the fixed coordinate system. However there is no associated option for monitoring the rotating planet gears of the various stages of a planetary gear train in a rotating manner. In particular rotating monitoring of the second or third or following stages respectively of a planetary gear train has not been possible up to now.

In determining the torque, so-called "telemetry" sensors are generally mounted in the rotating coordinate system. However these systems need energy. The energy supply is either designed via slip rings or e.g. via a battery. However this is not designed for the lifetime.

SUMMARY OF THE INVENTION

The first and second objects of the invention are consequently to specify a measuring system for planet gear bearing monitoring and also a measuring method which is suitable in particular for detecting the variables of the second and following stages of a multistage planetary gear train.

The first object is achieved by specifying a measuring system for detecting variables on planet carriers of a planetary gear train comprising at least multiple planetary gear stages, wherein at least each planetary gear stage comprises a respective sun shaft, at least one respective ring gear, and also at least one respective planet gear which is connected to the respective sun shaft and the respective ring gear by a toothed engagement, and a respective planet carrier which is assigned to the at least one planet gear and is rotationally connected to the at least one planet gear, wherein at least one first sensor, having at least one connection for supplying the first sensor with electrical energy, is arranged on at least one of the planet carriers on at least one of the planetary gear stages for detecting the variables of the assigned planet gear, and wherein the planetary gear train has electronic power supply by means of which the at least one first sensor can be supplied with electrical energy and wherein the at least one planetary gear stage is selectable from each of the available planetary gear stages.

The second object is achieved by specifying a measuring method for detecting variables on planet carriers of a planetary gear train comprising at least multiple planetary gear stages, wherein at least each planetary gear stage comprises a respective sun shaft, at least one respective ring gear, and also at least one respective planet gear which is connected to the respective sun shaft and the respective ring gear by a toothed engagement, and a respective planet carrier which is assigned to the at least one planet gear and is rotationally connected to the at least one planet gear, wherein a detection of the variables of the assigned planet gear is enabled by at least one first sensor mounted on at least one of the planet carriers on at least one of the planetary gear stages, which first sensor has at least one connection for supplying the at least one first sensor with electrical energy, and wherein the at least one first sensor is supplied with electrical energy by means of electronic power supply of the planetary gear train, and wherein the at least one planetary gear stage is selectable from each of the available planetary gear stages.

The arrangement described makes it possible to measure each individual bearing of a planetary gear train.

All planetary gear stages can therefore be detected and monitored. Even those physical variables that are measurable under difficult ambient conditions (e.g. oil, temperature, rotary motion, etc.), such as vibration, acceleration, temperature, oil pressure, etc., can be detected here. According to the invention an energy supply to the sensing facilities on the rotating shafts is therefore possible. A data communication to the sensors is also possible by means of the energy supply.

In particular the proposed arrangement of the sensor(s) makes it possible, if present, to continuously monitor each individual planet gear during ongoing operation. Signaling of wear can be effected by the option of detecting the oil pressure and the vibrations of the planet gears rotating around the sun shaft at the location where the wear originates in the bearing mounting.

The sub claims list further advantageous measures which can be combined with each other as desired to achieve further advantages.

In a particularly preferred embodiment the electronic power supply supplies the at least one first sensor with energy contactlessly or wirelessly respectively. In this regard the wireless energy supply can be in the form of an inductive coupling, resonant inductive coupling, or a capacitive coupling with a coupling factor.

Preferably at least one planetary gear stage comprises multiple planet gears, wherein monitoring of all the planet gears can be accomplished by means of the at least one first sensor.

Preferably the electronic power supply is arranged on the first planet carrier, wherein the sun shaft is realized at least partly in the form of a hollow shaft and the electronic power supply has a first electrical connecting line routed through the said hollow shaft. In the case of large wind power plants, the accessibility is provided particularly easily here via the sun shaft and via the rotor hub. In this regard the electronics can be a 25-kHz transformer; in this regard the secondary coil can be realized in the form of a flexible printed circuit board. This arrangement makes it particularly easy to supply the electronic power supply without effort or rearrangement of the gear train. The sensors arranged on other planet carriers are then supplied with energy contactlessly or wirelessly respectively by this electronic power supply facility. Due to the cable hookup for the electronic power supply, enough energy is available to same for a transmission of this type or same can be adequately supplied with energy respectively.

Also furthermore the first planetary gear stage can have at least one second sensor. In this regard a second electrical connecting line is provided from the electronic power supply to the second sensor of the first planetary gear stage for supplying the second sensor of the first planetary gear stage with energy. Naturally this second sensor can also be supplied with energy wirelessly by the electronic power supply as an alternative to the above.

In this regard the placement of the electronic power supply is of particular importance. In this regard the electronic power supply consists of a first and a second electronics facility. Preferably the first electronics facility is arranged on the face side (on the front side) of the first sun shaft of the first planetary gear stage. In the case of large wind power plants, the accessibility of the sun shaft can be provided via the rotor hub. Consequently it is possible to reach the electronic power supply (customer interface) at this location. For example this location is very easy to reach by dismantling a pitch tube cover usually present in the planet carrier. It is therefore possible to easily replace the electronic power supply in the case of servicing and during the lifetime of the plant.

In the case of multistage planetary gear trains it is necessary to also reach rotating parts, such as the planet carrier, with energy for supplying the sensor, on following stages which have a different speed. Via the planet carrier of the first stage it is possible, due to the coaxial arrangement of the further stages, to set up an inductive energy supply (or other energy supply) in e.g. an axial design, in a contactless manner. If further planetary gear sets with different speeds exist, then a sensor facility can likewise be provided there as a sub system with regard to energy supply and e.g. for transmitting measurement data.

Preferably a digital interface is provided for transmitting the data to a data processing system. In a further exemplary embodiment the digital interface is arranged on the face side (on the front side) of the at least one planet carrier of the first planetary gear stage.

Access to the second planetary gear stage is effected wirelessly or via radio respectively, both for the energy and also the data. As already described above, this location is easy to reach by dismantling the pitch tube cover in the planet carrier. It is therefore possible to easily replace the digital interface in the case of servicing and during the lifetime of the plant. With regard to transmitting the data, the sensors can be equipped with antennas.

Preferably the sun shaft is realized at least partly in the form of a hollow shaft, wherein a data transmission cable can be routed through the said hollow shaft to the digital interface. A secure and fast data hookup is therefore ensured to an external analysis station without altering or adapting the construction of the gear train.

Preferably the data transmission is effected contactlessly or wirelessly respectively from the at least one first sensor to the digital interface. At least the access to the second and where relevant following planetary gear stages is effected wirelessly or via radio respectively both for the energy and also the data. With regard to the transmission of the sensor data from the fastest stage (Intermediate Speed Stage) to the non-moving data processing system, two interfaces—one of them wireless—are needed. A corresponding arrangement of sensor antennas makes it possible for radio contact to an antenna to exist only for a specific interval in each revolution. Measurement data is then transmitted in buffered form in this interval. Furthermore a time stamp is transmitted. If multiple receive antennas are present, the rotational angle speed and later also the rotational angle offset between e.g. the Intermediate Speed Stage and the stator (gear train casing, gondola, etc.), or e.g. the planet carrier of the LSS (Low Speed Stage) and the IMS (InterMediate Stage) can be determined over a specific integration time period. This offset is caused by elastic shaft torsion and elastic deformation of the teeth of the gear wheels. It represents the current torque. As a result the deformation in the gear train could be calibrated on a once-only basis e.g. in the factory. The more antenna pairs, i.e. sensors, are provided, the more precisely the rotational angle offset and therefore the torque can be determined.

Preferably at least the first planetary gear stage has at least one second sensor. The data transmission from the second sensor to the digital interface is effected via a second data transmission cable. The digital interface and also the "analysis" electronics are arranged on the front side of the first planet carrier since this possesses the rotational speed of the rotor hub in wind power plant.

The hookup of the sensors in the first planetary gear stage is consequently effected by wired means. Access to the second planetary gear stage is preferably effected wirelessly or via radio respectively, both for the energy and also for the data.

The energy transmission can also be effected via a coupling with a coupling factor and the data transmission can be effected by outputting the modulation of the coupling factor. What is meant is that an energy transmission takes place between two parts that are rotating with reference to each other. This energy transmission can be structured such that the energy transmission is dependent on the angle of rotation. This dependency can also be established by modulation, not only by means of static offsets, so that e.g. the frequency or phase of the modulation of the coupling changes between the two parts. The speed can therefore be found out by monitoring the energy transmission, which can change via the angle of rotation in various characteristics. Normally only one variable is necessary (scalar energy measured value, frequency, phase, or similar) to determine the speed. The construction which is used for the energy transmission is at the same time also employed for determining the relative speed of the two parts with reference to each other. Coupling factor here means the electromagnetic coupling of the partners in the energy transmission path. This coupling can therefore not only be changeable in scalar terms, but also in vectorial terms over the course of a revolution.

In a preferred embodiment the data transmission from the at least one first sensor to the digital interface can be effected with buffering.

Multiple sensors can also be arranged on (the) at least one planet carrier. In particular these can be oil pressure measuring sensors, vibration measuring sensors, or acceleration measuring sensors.

BRIEF DESCRIPTION OF THE DRAWING

Further features, properties, and advantages of the present invention arise from the following description while making reference to the enclosed figures. These show the following in schematic form.

DETAILED DESCRIPTION OF PREFERRED EMBODIMENTS

Although the invention has been closely illustrated and described in detail by the preferred exemplary embodiment, the invention is not limited by the examples disclosed. Variations of this can be derived by a person skilled in the art without departing from the scope of protection of the invention as defined by the following claims.

Figure 1:
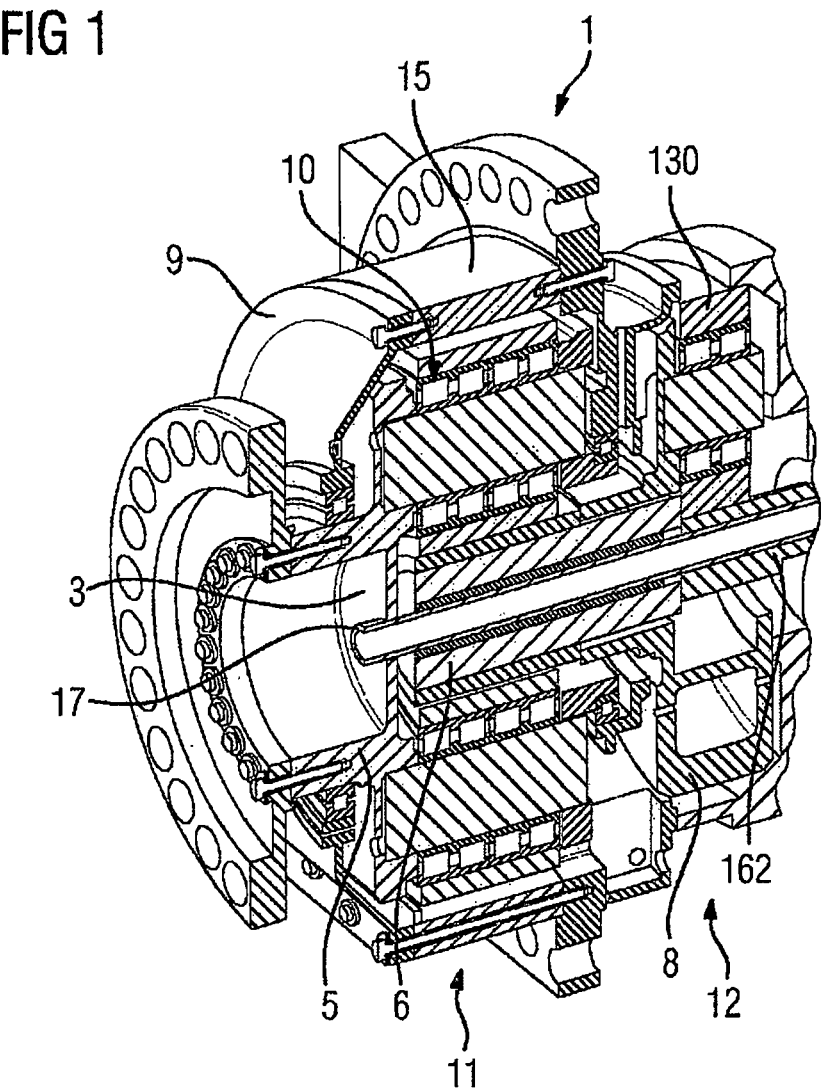
FIG. 1 a schematic representation of a planetary gear train according to the state of the art, FIG. 2 a first possible position of the inventive rotating sensors, FIG. 3 paths for the electrical energy supply and the measurement data transmission for the above exemplary embodiment.

FIG. 1 shows a cross-section of a 2-stage planetary gear train 1 for use in a wind power plant, comprising a first drive-side planetary gear stage 11 and a second output-side planetary gear stage 12. The output shaft of the gear train 1 is coupled to a generator. The sun shaft 6 of the first planetary gear stage 11 is coupled in a torsionally rigid manner to the planet carrier 8 of the second planetary gear stage 12.

In the planetary gear train 1, there are multiple rotating coordinate systems:

a) A gear train casing 9 and the ring gear 15 form a first coordinate system that is stationary relative to the gondola.

b) The first planet carrier 5 of the first planetary gear stage 11 and the first sun shaft 6 form a first rotating coordinate system, rotating with a speed.

c) In the planet carrier 5 are mounted planet gears 10 which engage with the sun shaft 6 and the ring gear 15. The sun shaft 6 of the first planet carrier 5 is connected to the second planet carrier 8 in a torsionally rigid manner.

d) The sun shaft 162 of the second planetary gear stage 12 is connected to the generator or a further gear train stage in a torsionally rigid manner. The planet gears 10 of the first planetary gear stage 11 and the planet gears 130 of the second planetary gear stage 12 form further rotating coordinate systems.

e) Additionally a pitch tube 17 and also a pitch tube cover 3 are provided.

Monitoring operating parameters in the gear train such as e.g. the temperature of bearings (e.g. with the aid of PT100 elements), vibrations (vibration monitoring with acceleration measuring sensors, e.g. based on the piezo effect), oil pressure in the oil feed lines provided for lubricating rotating components, oil level, etc. presents difficulties since a cabled connection between the sensors and a receiver unit in the coordinate system of the gondola is only possible for a few sensors due to the many different rotating coordinate systems.

However there are no options for monitoring rotating planet gears 10 in the various stages of a planetary gear train 1 of this type. In particular it is advantageous to monitor same e.g. with an oil pressure measuring sensor in order to know how much oil is actually being fed to the planet gear bearings. Therefore wear can be reduced and the lifetime increased.

The present invention enables the simple detection of variables and monitoring of multistage planetary gear trains 1 with sensors which have an increased energy requirement and need an increased bandwidth for data transfer.

Figure 2:
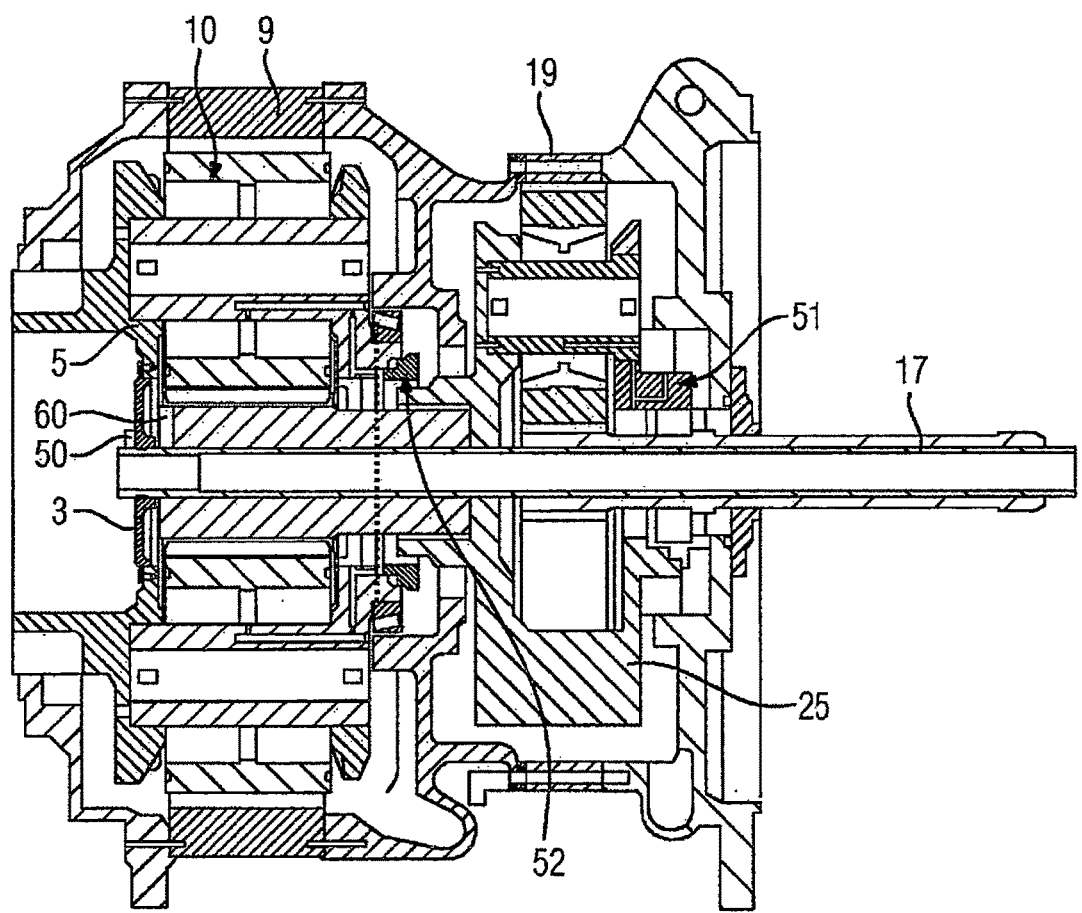

FIG. 2 shows the invention in detail. The invention allows the operation of sensors on the planet carriers by using an electronic power supply. Sensors are arranged on the planet carrier 5 of the first stage 11 (FIG. 1) and the planet carrier 25 of the second stage 12 (FIG. 1). In particular the inventive arrangement of the sensors makes it possible to continuously monitor each individual planet gear 10 of the first stage 11 (FIG. 1) and also of the following stages 12 (FIG. 1) etc. during ongoing operation. Detection of wear can be effected by detecting the oil pressure and/or the vibrations of the planet gears 10 rotating around the sun shaft 6, i.e. directly at the location where the wear originates.

The electronic power supply supplies the one sensor or multiple sensors with energy wirelessly or contactlessly respectively. It is possible in this regard for the sensors of the first planetary gear stage 11 (FIG. 1) to still be hooked up to the electronic power supply with a cable and the supply to the sensors on the further planetary gear stages 12 (FIG. 1) to be effected wirelessly or contactlessly respectively. The power supply for the sensors in the first planetary gear stage 11 (FIG. 1) can be implemented by wired means. In this regard the electronic power supply can consist of a first electronics facility 50, e.g. a customer interface in the first coordinate system, and a second electronics facility 60, e.g. a transmit and receive unit for the sensors. This is arranged in the second coordinate system. In this regard the customer interface is arranged on the planet carrier 5.

Additionally a digital interface 53 (FIG. 3) is provided which receives data via a wireless connection from the one or multiple sensors, wherein one or multiple sensors can be arranged in the second or following rotating planetary gear stage 12 (FIG. 1).

A digital interface 53 (FIG. 3) and also the first electronics facility 50 are arranged on the planet carrier 5, since this possesses the rotational speed of the rotor hub in the power generation plant.

Access to the second planetary gear stage 12 (FIG. 1) is effected wirelessly or via radio respectively both for the energy and also for the data. In the case of e.g. large wind power plants the accessibility of the sun shaft 6 is provided via the rotor hub. It is consequently possible to reach the electronic power supply at this location.

The radio electronics facility can also be reached via this route since according to the invention it is installed on the face side of the sun shaft 6 (FIG. 1) of the first planetary gear stage 11 (FIG. 1). This location is easily reached by dismantling the pitch tube cover 3 in the planet carrier 5. It is therefore possible to easily replace the electronic power supply in the case of servicing and during the lifetime of the plant, e.g. wind power plant.

For example the energy, e.g. a 25-kHz connection, can be transmitted via an inductive or capacitive coupling.

Additionally data originating from the sensors can be transmitted via a 2.4-GHz radio connection. This data can also be output not only via radio but also via a modulation of the coupling factor.

Furthermore an RFID-based (Radio Frequency Identification) or SAW-based (Surface Acoustic Wave) sensor module respectively would also be conceivable. The energy supply or the interrogation signal respectively for the module is effected in this case by means of the RFID/SAW reader and its antenna, which likewise enables transmission of the measurement data. Due to the comparatively small amount of effort in terms of hardware, modules of this type are advantageous and inexpensive.

Simple, direct monitoring of the planet gear bearings and also the generation of additional information (e.g. oil pressure in the planet carrier) is rendered possible for the first time.

The planet carrier 5 rotates slowly with the rotor blades. Through the pitch tube 17 that is generally present in a wind power plant, the necessary lines (energy supply, sensor data, etc.) can then be tapped into on the generator side, for example by means of slip rings or WLAN. By the nature of the system, a rotor hub is always supplied with energy and data since the pitch tube drives demand this for adjusting the blades. Additionally the electronic power supply can be subject to replacement or maintenance respectively through the existing maintenance entrance.

In the case of multistage planetary gear trains 1 (FIG. 1) it is necessary to also reach rotating parts, such as the planet carrier 8 (FIG. 1), with energy for supplying the sensor on following stages 12 (FIG. 1) etc. which have a different speed.

Via the planet carrier 5 of the first stage 11 (FIG. 1) it is possible, due to the coaxial arrangement of the further stages 12 (FIG. 1), to set up an inductive energy supply (power supply device 50), here in an axial design, in a contactless manner. In the case of further planet gears with different speeds a sensing facility, here realized in the form of an oil measuring sensor 51 and an acceleration sensor 52, can likewise be provided as a sub system with regard to energy supply and transmission of the measurement data. The arrangement described makes it possible to measure each individual bearing of a planetary gear train.

In gear train engineering it is furthermore frequently a matter of interest to determine the transmitted torque, which can be measured by the sensors.

Figure 3:
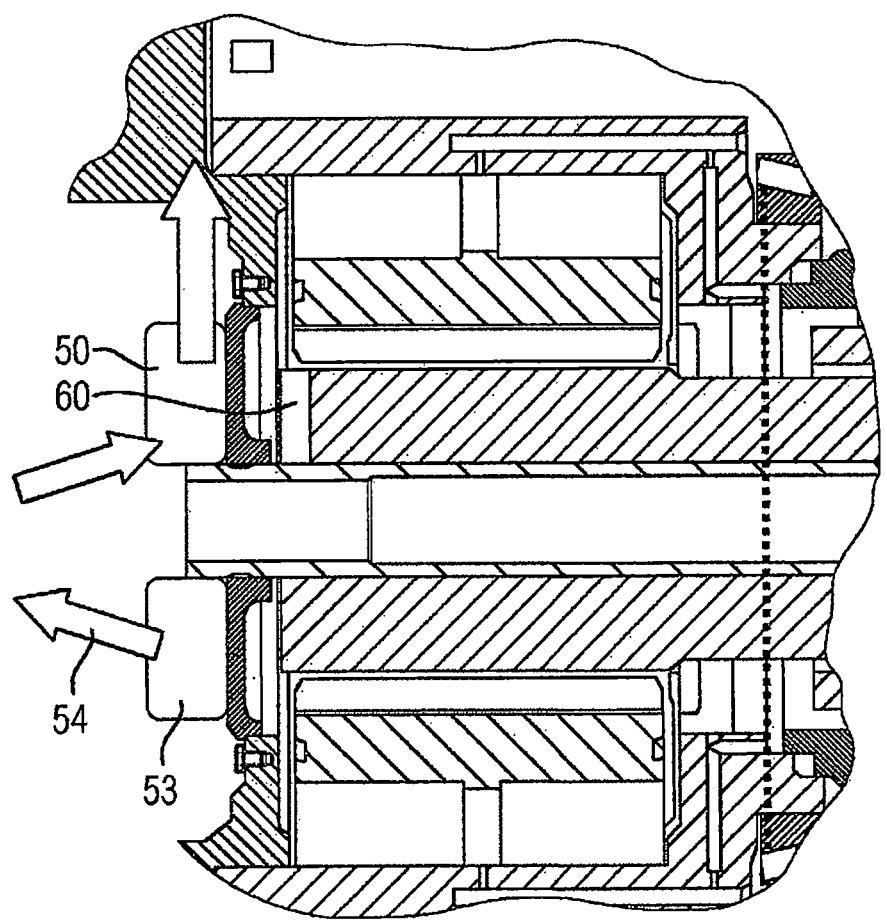

FIG. 3 shows the transmission of sensor data. A wireless interface is needed from the fastest stage (Intermediate Speed Stage) to the non-moving digital interface 53. A corresponding arrangement of the antennas makes it possible for radio contact to exist to an antenna only for a specific interval in each revolution.

In FIG. 3 this wireless measurement data transmission from the intermediate Stage to the digital interface 53 is shown by means of an arrow 54. The digital interface 53, which is arranged on the first stage (also referred to below as the Low Speed Stage), is hooked up to an external data processing system (not shown) with the aid of a data transmission cable (not shown). The sensors are connected to a second electronics facility 60 in the second coordinate system. The second electronics facility 60 is implemented with antennas in the form of a transmit and receive unit for data and energy. The measurement data is transmitted to the digital interface 53 with buffering by means of radio. A corresponding arrangement of the antennas makes it possible for radio contact to exist to an antenna only for a specific interval in each revolution. The buffered measurement data is then transmitted in this interval. Furthermore a time stamp is transmitted. If multiple receive antennas are present, the rotational angle speed and later also the rotational angle offset between e.g. the first and second stages can be determined over a specific integration time period. This offset is caused by elastic shaft torsion and elastic deformation of the teeth of the gear wheels. It represents the current torque. The more sensors or antenna pairs respectively are provided, the more precisely the torque can be determined.

The figure shows a setup for the contactless energy supply in an axial design. Naturally it is also possible to set up the contactless energy supply in a radial design on the planet carrier of the following planetary gear stages.

Monitoring operating parameters in the gear train such as e.g. the temperature of bearings (e.g. with the aid of PT100 elements), vibrations (vibration monitoring with acceleration measuring sensors, e.g. based on the piezo effect), oil pressure in the oil feed lines provided for lubricating rotating components, oil level, etc. presents difficulties since a cabled connection between the sensors and a receiver unit in the coordinate system of the gondola is only possible for a few sensors due to the many different rotating coordinate systems. Sensors which are arranged in one of the rotating coordinate systems have to be connected to a receiver unit in the coordinate system of the gondola via a wireless connection.

The invention makes it possible to measure those physical variables that are measurable (e.g. vibration, acceleration, temperature, oil pressure, etc.) for each stage of a planetary gear train under difficult conditions (e.g. oil, temperature, rotary motion, etc.). In fact the invention now enables an energy supply to the sensing facilities on the rotating shafts as well as a communications hookup for the sensors on each planetary gear stage.

The advantage consists in the fact that it is possible for the first time to obtain sensor signals from all "rotating" planetary gear stages over the respective lifetime. This is achieved by the invention and the servicing opportunity which presents. According to the invention an electronic power supply transmits energy wirelessly or contactlessly respectively to one or multiple sensors. Data is likewise transmitted via a wireless connection from the one or multiple sensors to a digital interface 53, wherein the one or multiple sensors are arranged in the second rotating coordinate system.

According to the invention a radio energy transmission on the rotating part is used for the speed determination and the speed-dependent sampling rate. A location-dependent energy transmission is effected by means of a coupling (coupling factor) during rotation in the gear train for the speed signal in the rotating part. The speed signal is routed to the outside and can be used by sensors for recording data. The information can be output by radio or via modulation of the coupling factor.

The result is that it is possible for the first time to obtain sensor signals from the "rotating" planetary gear stages over the respective lifetime.

The invention claimed is:

1. A measuring system for monitoring a planetary gear train having a plurality of planetary gear stages, each planetary gear train including a sun shaft, a ring gear, a planet gear connected to the sun shaft and ring gear, and a planet carrier rotationally connected to the planet gear, said measuring system comprising:
   a sensor arranged on the planet carrier of a selected one of the planetary gear stages for detecting a variable of the planet gear; and
   an electronic power supply operably connected to the first sensor for supply of the sensor with electrical energy.

2. The measuring system of claim 1, wherein the electronic power supply supplies the sensor with energy in a contactless manner or wirelessly.

3. The measuring system of claim 1, wherein the sensor is configured to monitor multiple planet gears of the selected one planetary gear stage.

4. The measuring system of claim 1, wherein the electronic power supply includes a first electronics facility arranged on the planet carrier of the selected one of the planetary gear stages, and a second electronics facility arranged on end face of the sun shaft of the selected one of the planetary gear stages.

5. The measuring system of claim 4, wherein the second electronics facility has an electrical connecting line routed through the sun shaft which is configured in the form of a hollow shaft.

6. The measuring system of claim 1, further comprising a digital interface for transmitting data to a data processing system.

7. The measuring system of claim 6, wherein the digital interface is arranged on a front side of the planet carrier of the selected one of the planetary gear stages.

8. The measuring system of claim 6, wherein the data is transmitted in a contactless manner or wirelessly from the sensor to the digital interface.

9. The measuring system of claim 8, wherein the data is transmitted wirelessly by using radio or optics.

10. A measuring method for monitoring a planetary gear train having a plurality of planetary gear stages, each planetary gear train including a sun shaft, a ring gear, a planet gear connected to the sun shaft and ring gear, and a planet carrier rotationally connected to the planet gear, comprising:
    arranging a sensor on the planet carrier of a selected one of the plurality of planetary gear stages for detecting a variable of the planet gear; and
    operably connecting an electronic power supply of the planetary gear train to the sensor for supply of the sensor with electrical energy.

11. The measuring method of claim 10, further comprising transmitting the electrical energy wirelessly.

12. The measuring method of claim 11, wherein the electrical energy is transmitted wirelessly via a capacitive coupling or an inductive coupling.

13. The measuring method of claim 12, further comprising transmitting sensor data via a digital interface; and modulating a coupling factor for transmitting the sensor data.

* * * * *